(12) United States Patent
Allamano et al.

(10) Patent No.: US 10,209,404 B2
(45) Date of Patent: Feb. 19, 2019

(54) METHOD FOR MEASURING A PARTICLE PRECIPITATION RATE, AND DEVICE THEREOF

(71) Applicant: Politecnico Di Torino, Turin (TO) (IT)

(72) Inventors: Paola Allamano, Turin (IT); Alberto Croci, San Rafaele Cimena (IT); Francesco Laio, Turin (IT)

(73) Assignee: Politecnico Di Torino, Turin (IT)

( * ) Notice: Subject to any disclaimer, the term of this patent is extended or adjusted under 35 U.S.C. 154(b) by 0 days.

(21) Appl. No.: 15/543,147

(22) PCT Filed: Jan. 11, 2016

(86) PCT No.: PCT/IB2016/050100
§ 371 (c)(1),
(2) Date: Jul. 12, 2017

(87) PCT Pub. No.: WO2016/113658
PCT Pub. Date: Jul. 21, 2016

(65) Prior Publication Data
US 2017/0363776 A1    Dec. 21, 2017

(30) Foreign Application Priority Data
Jan. 13, 2015  (IT) .............................. TO2015A0029

(51) Int. Cl.
*G06K 9/00* (2006.01)
*G01W 1/14* (2006.01)
(Continued)

(52) U.S. Cl.
CPC ................. *G01W 1/14* (2013.01); *G06T 7/20* (2013.01); *G06T 7/62* (2017.01); *G06T 2207/30192* (2013.01)

(58) Field of Classification Search
CPC .. G01W 1/14; G06T 2207/30192; G06T 7/20; G06T 7/62
(Continued)

(56) References Cited

U.S. PATENT DOCUMENTS

| 7,660,517 B2* | 2/2010 | Garg ....................... G01W 1/14 348/239 |
| 2007/0053671 A1 | 3/2007 | Garg et al. |
| 2010/0157076 A1 | 6/2010 | Garg et al. |

FOREIGN PATENT DOCUMENTS

GB    2500592 A    10/2013

OTHER PUBLICATIONS

International Preliminary Report on Patentability dated Jul. 18, 2017, issued in PCT Application No. PCT/IB2016/050100, filed Jan. 11, 2016.
(Continued)

*Primary Examiner* — Charlotte M Baker
(74) *Attorney, Agent, or Firm* — Workman Nydegger

(57) ABSTRACT

A method for measuring a particles' precipitation rate includes the steps of acquiring at least one first image during a precipitation event through an image acquisition device having a sensor and lens; detecting the particles of the precipitation in the at least one first image by subtracting a background of the first image and setting a brightness threshold for detecting the particles, the particles being visible as a plurality of streaks in the image, wherein a first portion of the plurality of streaks comprises blurred streaks, and a second portion of the plurality of streaks comprises focused streaks; determining an apparent diameter and an apparent length for the plurality of streaks; estimating an actual diameter and an actual length for the plurality of streaks by resolving an equations' system having three equations and three unknowns, namely the actual diameter, the actual length and a depth position of the plurality of
(Continued)

streaks, the depth position being the position of each particle from the lens, in which a first equation has the actual diameter as unknown in function of the depth position, a second equation has the actual length as unknown in function of the depth position and a third equation equals the theoretical terminal velocity of the particles with an estimated velocity of the particles in function of the depth position; estimating the velocity of the particles based on the ratio between a net streak length and an exposure time used to take at least one first image; estimating the particles' precipitation rate based on the actual diameter and the velocity (v).

7 Claims, 7 Drawing Sheets

(51) Int. Cl.
     *G06T 7/62*     (2017.01)
     *G06T 7/20*     (2017.01)
(58) Field of Classification Search
     USPC ........................................... 382/107
     See application file for complete search history.

(56) References Cited

OTHER PUBLICATIONS

Nicolas Fdida et al., *Drop Size Distribution Measured by Imaging: Determination of the Measurement Volume by the Calibration of the Point Spread Function*, Meas. Sci. Technol. vol. 21, 2010, 15 pp.

Kshitz Garg al., *Detection and Removal of Rain from Videos*, Proceedings of the 2004 IEEE Computer Society Conference on Computer Vision and Pattern Recognition, vol. 1, Jun. 2004, pp. 528-535.

Julian T. Kashdan et al., *Two-Phase Characterization by Automated Digital Image Analysis. Part 1: Fundamental Principles and Calibration of the Technique* Part. Part. Syst. Charact., vol. 20, No. 6, Dec. 9, 2003, pp. 387-397.

Cord A. and D. Aubert, *Towards Rain Detection Though Use of In-Vehicle Multipurpose Cameras*, IEEE Intelligent Vehicles Symposium IV, Jun. 5-9, 2011, pp. 833-838.

A. Overeem et al., *Measuring Urban Rainfall Using Microwave Links from Commercial Cellular Communication Networks*, Water Resources Research, vol. 47, W12505, 2011, 16 pp.

A. Overeem et al., *Country-wide Rainfall maps from Cellular Communication Networks*, PNAS, Feb. 19, 2013, vol. 110, No. 8, pp. 2741-2745.

International Search Report and Written Opinion dated Apr. 20, 2016, issued in PCT Application No. PCT/IB2016/050100, filed Jan. 11, 2016.

* cited by examiner

METHOD FOR MEASURING A PARTICLE PRECIPITATION RATE, AND DEVICE THEREOF

BACKGROUND OF THE INVENTION

1. Field of the Invention

The present invention relates to a method for measuring a particles' precipitation rate and a related device.

2. Present State of the Art

With the term precipitation are meant all those phenomena of particles transfer, in a liquid or solid state, in a volume of fluid, each particle being characterized by its terminal velocity, i.e., the velocity reached by the particle when the gravity force is equalled by the drag force. Precipitation can be of meteorological type, that relate to the transfer of water particles (also called hydrometeors) from the atmosphere to the soil, e.g., rain, snow, hail, dew, frost, and so on; of settling type, i.e. the process by which particulates settle to the bottom of a liquid and form a sediment, and of chemical type, i.e., the formation of a separable solid substance from a solution and the subsequent sinking in the liquid phase.

It is known that the fundamental means for measuring at-ground precipitation is the rain gauge. The total number of gauges across the Earth ranges from a few thousand, which are available in near real time, to an estimated hundreds of thousands if amateur gauges are included. Taking all the GPCC ("Global Precipitation Climatology Centre") available gauges (67000) and representing for each of them a 5 km radius surrounding region (an unrealistically large region of influence if one considerers the tremendous spatial variability of rainfall), one realises that less than 1% of the Earth's surface is represented.

Coupling remote (e.g., satellite and radar) precipitation measures with gauge precipitation observations partially allows to bridge the gap between the discrete information provided by the rain gauge network and the real spatial dynamics related to the precipitation fronts. The operation, however, requires working at the interface between very different families of data, referred to uneven volumes. As a consequence, the combination of the various signals may result to be more complicated and less effective than one would expect, in particular when short-duration rainfall is considered. Few approaches are known having the objective of intensifying the spatial rain gauging density relying on unconventional monitoring methods. One of these proposes to exploit cars as moving rain gauges with windshield wipers or optical sensors functioning as measurement devices. Another application towards the detection of rain through the use of in-vehicle sensors is presented by Cord A. and D. Aubert, "Towards rain detection through use of in-vehicle multipurpose cameras", IEEE Intelligent Vehicles Symposium IV, 833-838. The results show that a high number of (possibly inaccurate) measures provide more reliable areal rainfall estimations than a lower number of (presumably precise) measurements. Interesting perspectives are also provided by the use of digital cameras to retrieve snow cover characteristics (see document "Potential of time-lapse photography of snow for hydrological purposes at the small catchment scale" of Parajka J. et al.), and by the exploitation of cell phone signals to retrieve rainfall intensity (see documents "Measuring urban rainfall using microwave links from commercial cellular communication networks" of Overeem A. (2011), Water Resources Research and "Country-wide rainfall maps from cellular communication networks" of Overeem A. et al. (2013), Proceedings of the National Academy of Science (PNAS)).

It is also known the patent application WO 2014/107434 A1 which describes an hardware and software methodology for three-dimensional imaging in connection with a single sensor. Such a methodology provides for capturing a plurality of images at different degrees of focus without focus change of an objective lens between such images. Depth information is extracted by comparing image blur between the images captured on the single sensor.

Finally, the patent application US 2010/0157076 A1 describes a method for measuring rainfall using an image acquisition device and comprises the steps of adjusting settings of the image acquisition device to enhance the visibility of rain, wherein the settings comprise at least one of: focal length, F-number, and exposure time; acquiring a plurality of images with the image acquisition device; and computing a measure of the rain rate based on counting the number and size of focused raindrops drops belonging to the focused plane) in each of the plurality of images.

However, the rain rate based on counting the number and size of raindrops exclusively in the focused plane does not allow to obtain a reliable estimation thereof, because it leads to the detection of a very limited number of particles. It is known that the uncertainty associated with the precipitation rate estimate rapidly increases with the decrease of the number of detected particles (as it occurs with rain gauges with very small catching surfaces).

Generally, such approaches known in the art do not allow a good estimation of particles precipitation in a certain area or volume of fluid because they are solely based on the detection of focused particles. Moreover, the existing instruments do not allow to retrieve precipitation measures at very high temporal resolution (the current temporal resolution is typically of one measure every 10 minutes). Finally, equipping a gauging station with state-of-the-art instrumentation has relevant costs in terms of instrumentation itself, installation and maintenance of the station.

SUMMARY OF THE INVENTION

It is therefore one object of the present invention to provide a method for measuring a particles precipitation rate, and a related device, to improve the estimation of the precipitation rate with respect to state of the art methods.

It is a second object of the present invention to provide a method for measuring a particles precipitation rate, and a related device, to increase the spatial density of precipitation observations.

It is a third object of the present invention to provide a method for measuring a particles precipitation rate, and a related device, which enable to retrieve measures of precipitation at very high temporal resolution at a very low cost.

It is a fourth object of the present invention to provide a method for measuring a particles precipitation rate, and a related device, based on the sampling of a large fluid volume (of the order of 3-5 cubic meters) leading to robust rate estimates.

These and other objects of the invention are achieved by a method for measuring a particles precipitation rate, and a related device, as claimed in the appended claims, which are intended to be an integral part of the present description.

In short, the following will describe a method for measuring a particles precipitation rate which provides for acquiring at least one image during a precipitation event through an image acquisition device and obtaining a precipitation rate through an analysis of particles present in the image. The image acquisition device according to the invention can be a camera able to shoot image and/or video, a smartphone or a tablet having a camera, a webcam, and so on.

More particularly, the method of the present invention relies on an analytical model of the blur variation with depth (i.e., moving away from the sensor of a camera) combined with the imposition of a boundary condition on particles terminal velocity. The method provides for correcting streaks diameters and lengths for blur effects, for positioning particles in depth and for estimating particles size distribution, particles density, and precipitation rate based on particles diameters over large sampled volumes. Thus, the method samples a large volume and hence a large number of particles (e.g., hydrometeors), and not only a plane (i.e., the focused plane) in the observed space.

The method is amenable for being used in all of types of the aforementioned precipitation. In the following, as a non-limitative example, explicit reference is made to the case of a meteorological precipitation, thus particles are hydrometeors.

Further features of the invention are set out in the appended claims, which are intended to be an integral part of the present description.

BRIEF DESCRIPTION OF THE DRAWINGS

The above objects will become more apparent from the following detailed description of a method and a device for measuring a particles precipitation rate according to the present invention, with particular reference to the annexed drawings, wherein.

DETAILED DESCRIPTION OF THE PREFERRED EMBODIMENTS

An image acquisition device (not shown in figures) according to the present invention can be a camera able to shoot images and/or video, a smartphone or a tablet having a camera, a webcam, and so on. The image acquisition device comprises at least one processor, lens and a sensor arranged for taking images and/or videos, and memory means for storing said images and/or videos.

Figure 1:
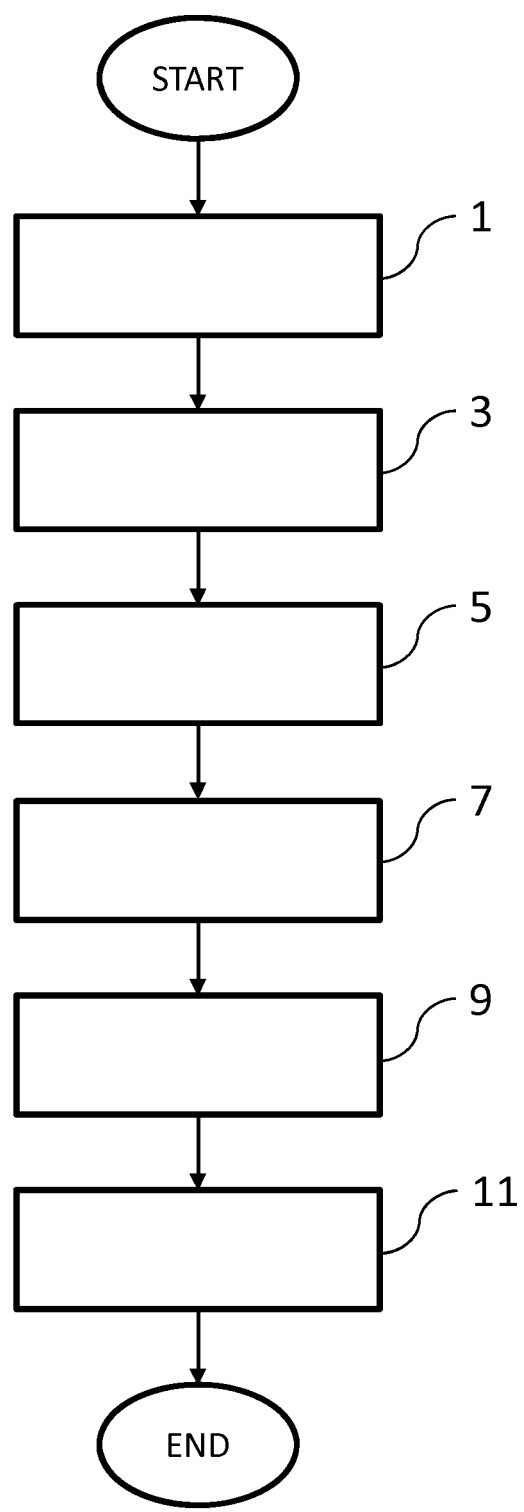
FIG. 1 shows a block diagram of the method according to the present invention.

With reference to FIG. 1, a method for measuring a particles precipitation rate according to the present invention comprises the steps of:
(block 1) acquiring at least one first image, in particular during a precipitation event, through an image acquisition device having a sensor and lens;
(block 3) detecting particles of said precipitation in said at least one first image, said particles being visible as a plurality of streaks in said image, wherein a first portion of said plurality of streaks comprises blurred streaks, and a second portion of said plurality of streaks comprises focused streaks;
(block 5) determining an apparent diameter $D_{P,b}$ and an apparent length $L_{P,b}$ of said blurred streaks;
(block 7) estimating an actual diameter $D_P$ and an actual length $L_P$ of said blurred streaks using an actual depth position z of said blurred streaks, said apparent diameter $D_{P,b}$ and said apparent length $L_{P,b}$, said depth position z being the actual position of each particle from said lens;
(block 9) estimating an actual velocity of said particles;
(block 11) estimating said particles precipitation rate based on said actual diameter $D_P$ and said actual velocity.

It is important to specify that the focused streaks are taken into account for the computation of the particles precipitation rate as well. Indeed, diameters and lengths of focused streaks are directly derivable from the first image, because they are not affected from the blur.

The method of the present invention further comprises the step of acquiring a second image (taken in a different instant from the first image) through said image acquisition device and for subtracting said second image to said first image for deleting a background of said first image. If three images are available (taken in three different instants) the noise removal from the first image is more efficient. Deleting the background from the first image allows to detect particles in the first image. Moreover, it is provided for setting a brightness threshold for detecting particles.

Figure 2A:
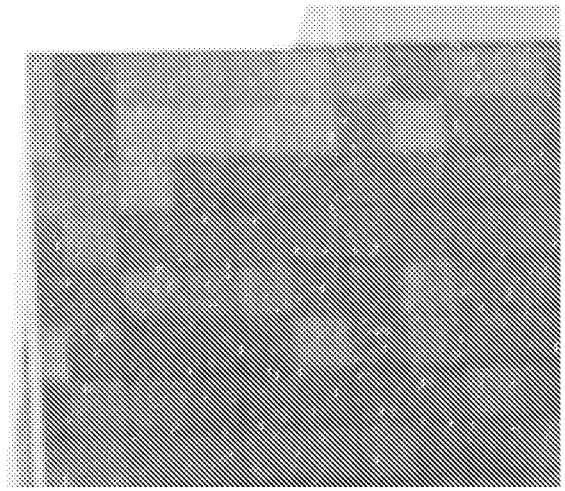
FIGS. 2a and 2b show examples of images taken by a camera in rainy conditions.
Figure 2B:
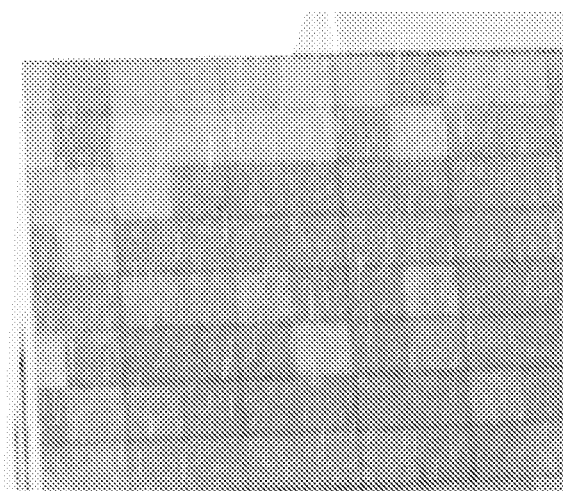

The method according to the present invention will be more clear from the following description. In the following will be described in detail the method considering rain drops as particles and the image acquisition device is a camera having a sensor. Consider the camera observing a volume of rain. Rain produces sharp intensity changes in pictures/images and videos. Rain visibility strongly depends on camera parameters. For instance, it is rather easy to verify that, at short exposure times (~0.001 sec), rain appears in the form of stationary drops (an example is shown on FIG. 2a), while at normal exposure (~0.015 sec), due to their fast motion, raindrops produce blurred rain streaks (an example is shown on FIG. 2b) because they typically stay at a pixel for a time that is far less than the exposure time $t_e$.

Different rain streaks have different diameter (i.e., width or size), length and intensity, depending on drop characteristics and camera parameters. The present invention advantageously exploits streaks characteristics to quantitatively derive drop diameter, drop velocity, and rain rate (i.e., the particles precipitation rate).

Figure 3:
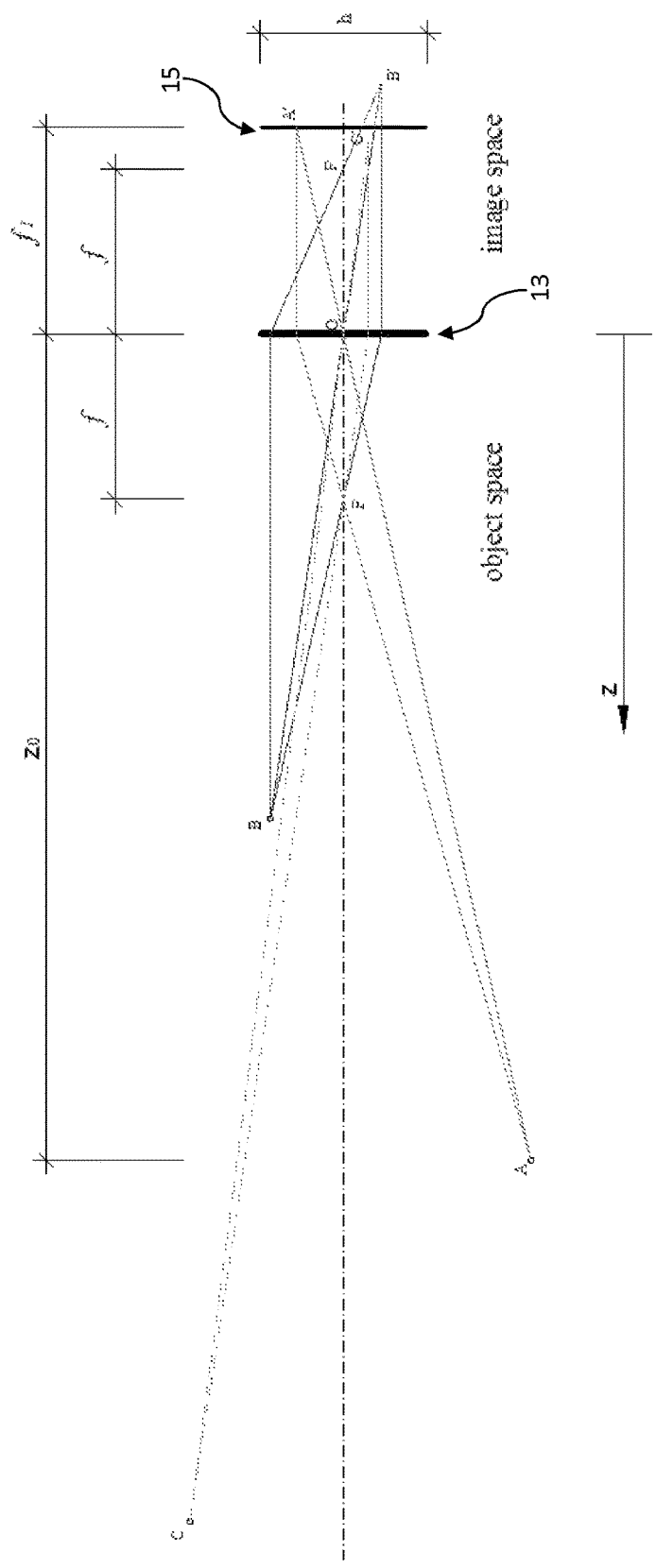
FIG. 3 shows an example of ray diagram of objects taken by a camera.

With reference to FIG. 3, it is shown a ray diagram where $z_0$ represents the focused distance, f is the focal length, z represents the distance of the object (A, B or C), i.e. raindrops, from the lens 13, h is the sensor height in millimeters and $f_1$ is the distance of the sensor 15 from the lens 13. A', B' and C' are the projections of the objects A, B and C on the sensor 15 respectively. The lens equation $$\frac{1}{f} = \frac{1}{f_1} + \frac{1}{z_0}$$

expresses the relation among f, $f_1$, and $z_0$.

As aforementioned, the method of the present invention comprises the step of acquiring a second image (taken in a different instant from the first image one) through the image acquisition device and subtracting the second image to the first image for deleting a background of the first image. If three images are available (taken in three different instants) the noise removal from the first image is more efficient.

In the next step, the method provides for detecting particles of the precipitation in at least one first image. Particles are visible as a plurality of streaks in the first image and a first portion of said plurality of streaks comprises blurred streaks, and a second portion of said plurality of streaks comprises focused streaks (i.e., not affected by blur).

Detecting particles is carried out by finding candidate rain pixels in at least one image. Thus, in this example, the method provides for finding candidate rain pixels by referring to couples (or triplets) of frames, i.e., images taken at two (or three) adjacent time steps (e.g., j−1, j and j+1). Subsequently, it is provided for comparing the brightness intensity I (e.g., 0≤I≤255) at each pixel in the first image $Im_j$ with the corresponding pixel intensity in the second image $Im_{j-1}$ (and third image $Im_{j+1}$). If the background remains stationary in said images, then the conditions of the following equation (1)

$$I(Im_j)-I(Im_{j-1})>S_1 \text{ \& } I(Im_j)-I(Im_{j+1})>S_1 \quad (1)$$

can be used to detect candidate drops with reference to the first image $Im_j$, being $S_1$ a brightness threshold that represents the minimum change in intensity due to a drop and the symbol & represents the AND logic condition. This latter condition applies only if three images are acquired. In other words, the method provides for setting the brightness threshold $S_1$ for detecting particles.

When three images are available, the conditions in equation (1) are both to be met in order to detect and select real drops. More in detail, pixels that meet just one of the two conditions of equation (1) should not be associated to raindrops, but to random noise in the first image (i.e., apparent particles or irregular borders).

The isolation of candidate rain pixels along a focused rain streak allows one to detect:

a) the number of candidate raindrops within the gauged volume by counting the number of streaks;

b) the drop diameter $D_P$ (in pixels) by setting it to the average width of the streak; and c) the drop velocity, which is proportional to the ratio of the net streak length to the exposure time $t_e$.

The net streak length is obtained by subtracting one drop diameter $D_P$ to the total length $L_P$ (in pixels) of the streak as it appears on the acquired image. Indeed, the velocity of a moving object is proportional to the distance covered in a time step by a fixed point of the object; considering the raindrop centre as the fixed point, this will cover $L_P-D_P$ pixels in a time $t_e$, while the total length of the streak will be $L_P$, because the drop occupies $D_P/2$ pixels above the drop centre, and $D_P/2$ pixels below it.

For non-stationary backgrounds, e.g., vegetation with leaves moved by wind, equation (1) is not effective to detect candidate drops. In this case the subtraction of two frames does not guarantee the removal of the false positives created by the visual effects of light interaction with moving surfaces. False positive could be detected with specific post-processing algorithms that, for instance, verify the presence/absence of sub-vertical preferential directions ascribable to the effect of rain streaks.

The appearance of rain in the acquired image (first image) is significantly affected by blur. The blur effect is caused by a cone of light rays from a lens not coming to a perfect focus when imaging a point source. Thus, the next step of the method is determining an apparent diameter ($D_{P,b}$) and an apparent length ($L_{P,b}$) of the blurred streaks.

Figure 4:
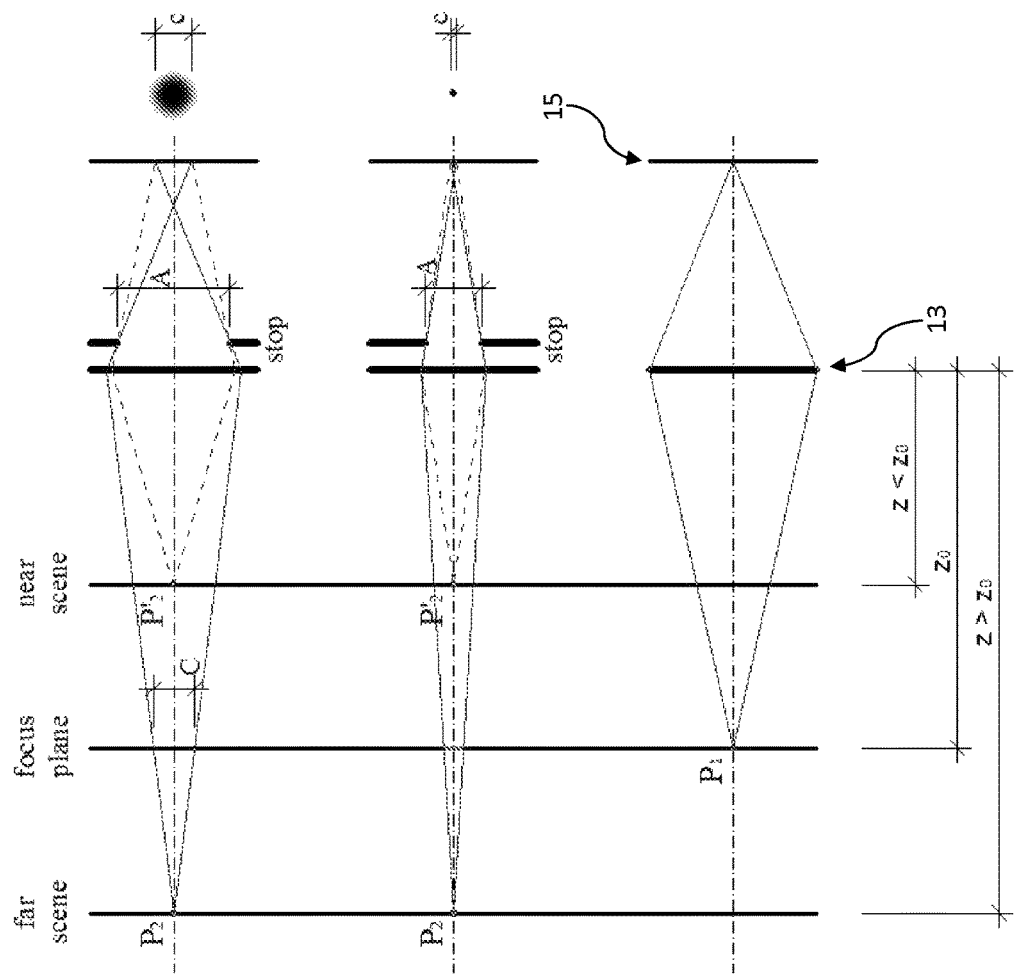
FIG. 4 shows optics behind the formation of a blur circle as a function of the aperture diameter for objects lying behind, within and before a focus plane.

With reference to FIG. 4, it is shown the optics behind the formation of the blur circle as a function of the aperture diameter A, for objects lying behind, within and before the focus plane. In particular, $P_2$ and $P_2'$ are out-of-focus objects, laying respectively before and behind the focus plane, and $P_1$ is a focused object; c is the blur circle and C is the auxiliary blur circle in the focus plane.

The diameter of the blur circle (or circle of confusion, $c_P(z)$, in pixels) is obtained by dividing the diameter of the auxiliary blur circle C by the magnification factor $f_1/z_0$ where $z_0$ is the distance of the focus plane from the lens 13. C is obtained via similar triangles as $$C = A\frac{|z-z_0|}{z}.$$

The blur circle in the image plane can hence be written as $$c = A\frac{|z-z_0|}{z} \cdot \frac{f_1}{z_0},$$

which exemplifies the dependence of the blur magnitude on z, $z_0$, $f_1$ and the aperture diameter A. By setting $z=z_0$ in the expression for c, then the blur effect is null on the focus plane. The diameter of the blur in pixels ($c_P(z)$), to be compared with the drop diameters and streak lengths, is obtained as $$c_P(z) = \frac{c \cdot H_P}{h} = \frac{A|z-z_0|}{z} \cdot \frac{f_1 \cdot H_P}{z_0 \cdot h} \quad (2)$$

where $H_P$ is the image height in the focus plane (in pixels) and h is the sensor height in millimeters (see FIG. 3).

Figure 5:
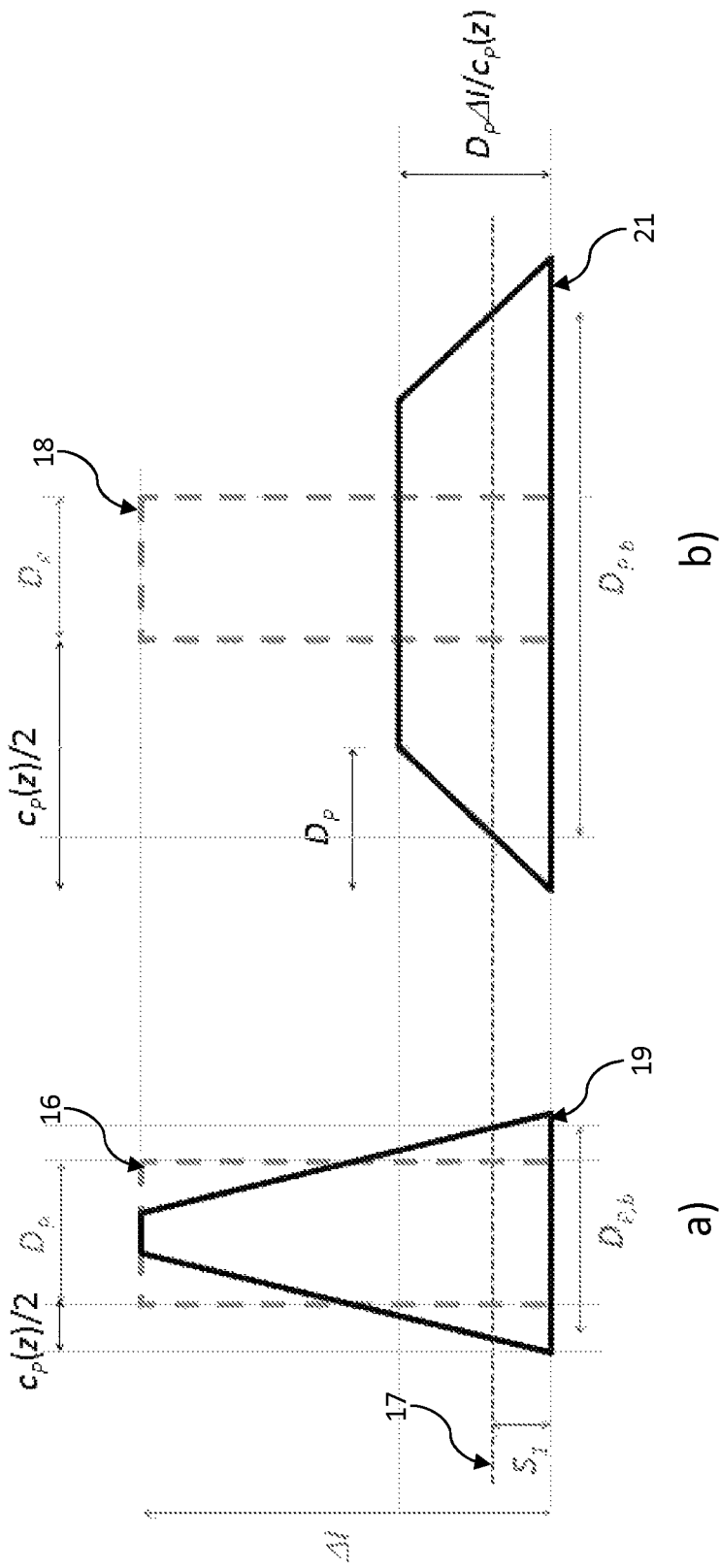
FIG. 5 shows two examples of representations of particles affected from blur.

With reference to FIG. 5, blur affects both diameter $D_P$ and length $L_P$ of out-of-focus drops, by fictitiously enhancing their size of a quantity $c_P(z)$. With $D_{P,b}$ and $L_{P,b}$ are identified the blurred diameters (apparent diameters) and blurred rain streak lengths (apparent lenght), respectively. Hence, when observing a volume of rain with a camera, it can be detected the "true" diameters and streak lengths of drops belonging to the focus plane. For out-of-focus drops, instead, only the corresponding blurred quantities may be directly inferred from the image. Moreover, the blur effect critically interacts with the effect of the threshold $S_1$ in the equation (1). Indeed, the blur acts on the drop projection on the image as a moving-average filter, changing the brightness pattern due to a drop from a sharp discontinuity (dashed lines 16,18 in FIG. 5) to a smooth, trapezoidal-shaped pattern (continuous lines 19,21 in FIG. 5). More in detail, the dashed lines 16,18 indicate the sharp brightness discontinuity produced by a focused drop ($D_P$ is the actual drop diameter, ΔI is the maximum positive brightness impulse due to a drop). The smooth, trapezoidal-shaped patterns (continuous lines 19,21) are the blurred brightness patterns typical of out-of-focus drops ($c_P(z)$ is the magnitude of the blur in pixels). A line 17 represents the threshold filter ($S_1$) in equation (1), with $D_{P,b}$ being the drop diameter as it appears in the blurred (and filtered) image. On the left hand side it is shown the case a) of a slightly out-of-focus drop, whereas on the right hand side it is shown the case b) of a severely out-of-focus drop.

The drop detection in turn acts as a further threshold filter (line 17 in FIG. 5) on the blurred projection of the drop. As a result of the combined effect of these two filters, the relation between blurred and actual drop diameter $D_P$ and streak length $L_P$ can be obtained as the result of simple geometrical reasoning (see FIG. 5), producing:

$$\begin{cases} D_P = D_{P,b} - c'_P(z) \\ L_P = L_{P,b} - c'_P(z) \end{cases} \quad (3)$$

where $$c'_P(z) = C_P(z) \cdot \left(1 - \frac{2S_1}{\Delta I}\right)$$

and $\Delta I$ is the maximum positive brightness impulse due to a drop (typically $\Delta I$=50). It is to be noted that, in the presence of blur, drops that are either very small or very distant from the focus plane may produce small brightness variations in the image, which may be undistinguishable from the random noise. This effect, in FIG. 5, would generate trapezoidal patterns whose height falls below the threshold $S_1$. This is the reason why, in the following, some limit values will be imposed for the distance from the focus plane and drop size to be considered.

From the image analysis, the actual diameter $D_P$ and the actual length $L_P$ values of each drop present in the image can be obtained; to obtain $D_P$ and $L_P$ the system of equations (3) has to be solved. However, in these equations there is a third unknown quantity, which is the distance from the lens z, i.e., the depth position. One more equation is thus needed to position the drops at the right distance z from the lens and infer the blur magnitude. In other words, the method of the present invention provides for estimating the actual diameter $D_P$ and the actual length $L_P$ of blurred streaks using the actual depth position z of blurred streaks, the apparent diameter $D_{P,b}$ and the apparent length $L_{P,b}$. Said depth position z is the actual position of each particles (e.g., raindrops) from the lens of the camera.

To set the third equation the present invention provides for estimating the drop velocity v of the particles, e.g., raindrops, derived from the ratio of the net streak length (preferably calculated as $L_P$–$D_P$ multiplied by the pixel dimension $d_P(z)$ to express it in millimeters) to the exposure time $t_e$ used to take at least one first image. More in detail, the step of estimating the actual diameter $D_P$ and the actual length $L_P$ of blurred streaks provides for resolving an equation system having three equations and three unknowns, namely said actual diameter $D_P$, said actual length $L_P$ and said actual depth position z, in which the first equation has said actual diameter $D_P$ as unknown in function of depth position z, a second equation has said actual length $L_P$ as unknown in function of depth position z (see equation 3) and a third equation equals the theoretical terminal velocity of said particles with an estimated (drop) velocity v of said particles in function of depth position z (see next equation 4).

The estimated drop velocity v is equalled to the drop terminal speed (theoretical terminal velocity) expressed as $$\sqrt{\frac{4}{3} \frac{\rho}{C_D \cdot \rho_a \cdot 1000} g \cdot D},$$

where $C_D$ is the drag coefficient which is approximately equal to 0.5 for a sphere, $\rho$ is the water density, $\rho_a$ is the air density and g is the gravitational acceleration. The terminal velocity is also a function of the drop diameter, being $D$=$D_P \cdot d_P(z)$. The diameters and streak lengths can be expressed in millimeters, while other variables are in IS ("International System") units.

The equivalence between the two expressions for drop speeds reads:

$$\frac{(L_P - D_P) \cdot d_P(z)}{t_e \cdot 1000} = \quad (4)$$

$$\sqrt{\frac{4}{3} \cdot \frac{\rho}{C_D \rho_a} \cdot \frac{1}{1000} g \cdot D_P \cdot d_P(z)} = \sqrt{21.62 \cdot D_P \cdot d_P(z)}$$

The dependence on depth position z is expressed through $D_P$ and $L_P$ (see equation (3)) and through the variation of the pixel dimension $d_P$ with the distance z of the object from the lens, expressed as (see FIG. 3):

$$\frac{h}{f_1} = \frac{H(z)}{z} = \frac{H_P \cdot d_P(z)}{z} \Rightarrow d_P(z) = \frac{h}{f_1 \cdot H_P} z \quad (5)$$

In the following it is assumed the equation (4) to be valid for all drop diameters because very small drops play a minor role on the rain rate estimation.

The present invention provides for positioning drops along the dimension z, i.e. moving away from the lens 13; in other words it is possible to infer the third dimension from an intrinsically two-dimensional information (the image). The position of the drops in z is obtained by setting equation (5) in equation (4) and solving the system of equations (3) and (4), where the unknowns are the actual diameter $D_P$, the actual length $L_P$ and depth position z. The equation in z to be solved, in squared form, hence results:

$$\alpha^2 z^2 = \beta \cdot z - \gamma |z - z_0| \quad (6)$$

where:

$$\alpha = \frac{L_{P,b} - D_{P,b}}{t_e \cdot 1000} \cdot \frac{h}{f_1 \cdot H_P}, \beta = 21.62 \frac{D_{P,b} \cdot h}{f_1 \cdot H_P},$$

$$\gamma = 21.62 \frac{A}{z_0}\left(1 - \frac{2S_1}{\Delta I}\right).$$

Figure 6:
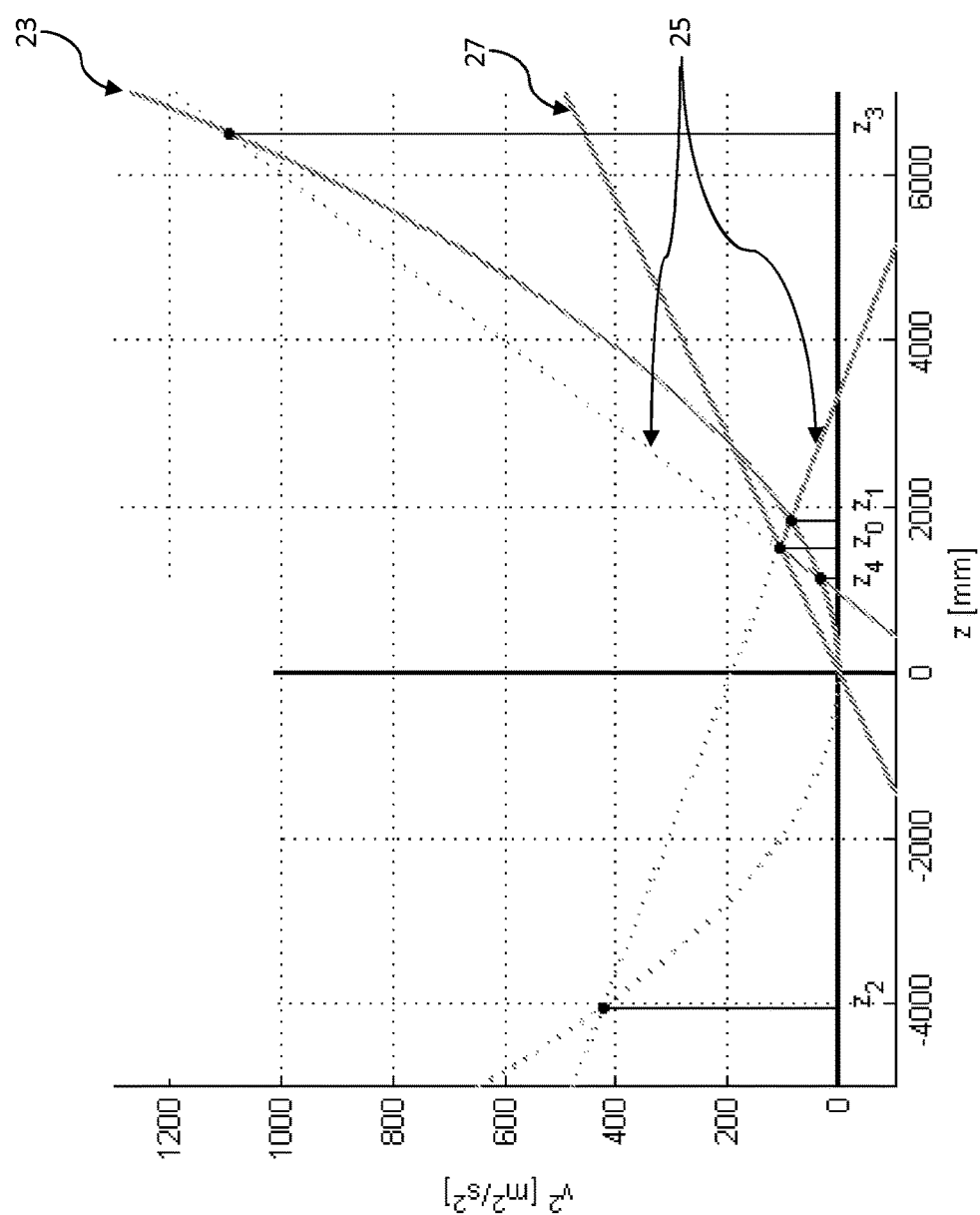
FIG. 6 shows an example of results regarding to depth position of particles.

With reference to FIG. 6, four analytical solutions in z are obtained: two for $z>z_0$ ($z_1$ and $z_2$) and the other two for $z<z_0$ ($z_3$ and $z_4$). FIG. 6 shows an example of these four solutions in relation to the two terms of equation (6), in particular a quadratic curve 23 is relative to the left hand side term of equation (6), the piecewise linear function 25 is relative to the right hand side term of equation (6) and line 27 is the squared terminal velocity without the effect of blur. The reference system shown in FIG. 6 indicates a quadratic velocity in $m^2/s^2$ on the ordinate, while on the abscissa indicates the distance z in mm. Thus, the method provides for estimating actual velocity based on the distance z, i.e., depth position z of the particle.

FIG. 6 clearly shows that the solutions $z_2$ and $z_3$ do not respect their existence boundaries (being respectively $z_2<0$ and $z_3>z_0$) and are hence classified as non-admissible. Solutions $z_1$ and $z_4$, instead, fall within their respective domains of existence, being $z_1$ and $z_4$ positioned at $z>z_0$ and $z < z_0$, respectively. The fact that two solutions remain valid implies that drops cannot be univocally collocated within the sampled volume; two different positions in z, and hence two different diameters $D_P$ may exist that satisfy the system of equations (3) and (4).

Figure 7:
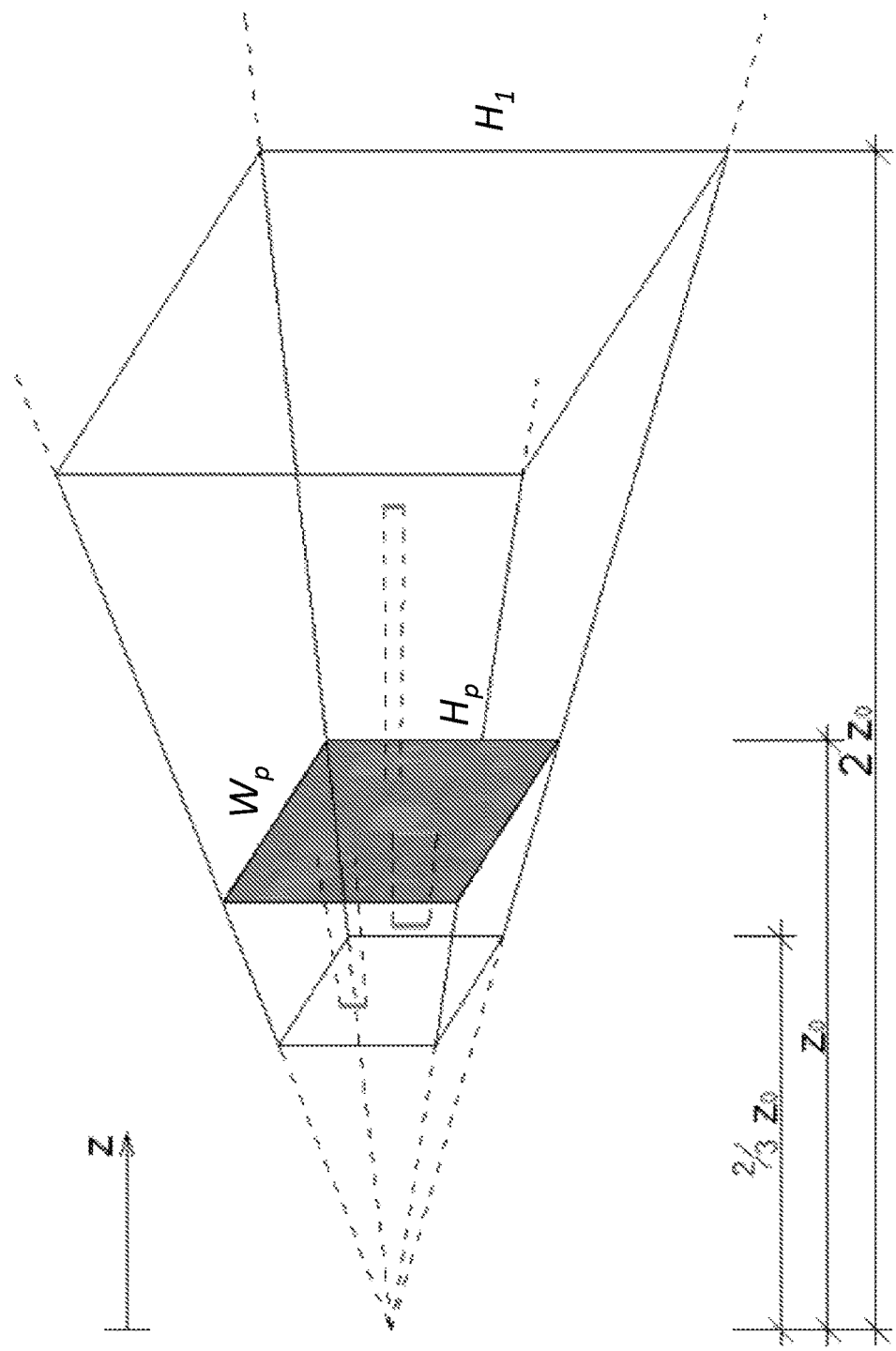
FIG. 7 shows an example of sampled volume for computing a particles precipitation rate.

With reference to FIG. 7, the method provides for determining depth position z of a drop in a sampled volume V.

Indeed, before making a decision between $z_1$ and $z_4$, an additional constraint is set to define the sampled volume V: preferably the depth of the volume is limited to $\frac{2}{3}z_0$ as a lower bound and to $2z_0$ as an upper bound. This condition, in some cases, allows to flag as unlikely one of the two solutions and to identify the other solution as the best one. Note that an object in $\frac{2}{3}z_0$ or in $2z_0$ would produce a blur circle in the focus plane C=A/2. The sampled volume V (i.e., the volume of the truncated pyramid with bases in $\frac{2}{3}z_0$ and $2z_0$) can be computed as a function of the image dimensions in pixels, $H_P$ (height of the image) and $W_P$ (width of the image), and of the width of the volume section at $z=2z_0$, $$V = \frac{52}{81}\left(z_0 \frac{W_P}{H_P} H_1^2\right) \quad (7)$$

More precisely, FIG. 7 shows the sampled volume V as a function of the variables reported in equation (7).

Despite the confinement of the sampled volume V, two admissible solutions $z_1$ and $z_4$, and hence two admissible diameters $D(z_1)$ and $D(z_4)$, still exist for the majority of drops. Non univocal cases of drop positioning can be further reduced by constraining drop diameters: for example it is possible consider that drops diameters larger than 6 mm and smaller than 0.5 pixel are very unlikely to occur, the first being a physical limit that is currently found in the literature, the latter deriving from the very low variations in pixel brightness induced by drops occupying less than half of the pixel. These conditions help to discern the most likely solution between $z_1$ and $z_4$, and to univocally attribute $N_{1u}$ drops to $z_1$ and $N_{4u}$ to $z_4$, with $N_{1u}+N_{4u}<N$, where N is the total number of detected raindrops. Moreover, the upper bound set on diameters allows to discard unlikely large diameters that are responsible for significant overestimations in the final estimate of rain rate.

To disentangle the remaining $N-(N_{1u}+N_{4u})$ cases of non univocal drop positioning, the method provides for adopting a pragmatic approach, namely to attribute drops to $z_1$ and $z_4$ randomly, by determining the probability to fall before (i.e., in $z_4$) or behind (i.e., in $z_1$) the focused plane. Then, it is provided for computing a first probability $P_1$ for a drop to fall in the volume behind $z_0$ as the ratio between the volume of the truncated pyramid with bases in $z_0$ and $2z_0$ and the total sampled volume V. A second probability $P_4$, i.e., the probability for a drop to fall in the volume before $z_0$, is computed accordingly as $P_4=1-P_1$. The number of drops $N_{1a}$ attributed to the volume behind $z_0$ is hence computed as $$N_{1a} = P_1 \cdot N - N_{1u} \quad (8)$$

Conversely, the number of drops $N_{4a}$ attributed to the volume before $z_0$ is obtained as $$N_{4a} = (1-P_1) \cdot N - N_{4u} \quad (9)$$

For each non-univocally positioned drop, a random number q is sampled from a uniform (0,1) distribution. If $q<N_{1a}/(N-N_{1u}-N_{4u})$ the drop is attributed to $z_1$, otherwise to $z_4$.

Through Monte Carlo simulations it has been verified that this random attribution algorithm only marginally affects the rain rate estimation.

Finally, the method provides for estimating the particles precipitation rate based on said actual diameter ($D_P$) and said actual velocity (see the following equation 10).

The method is amenable to be applied to set of images registered as a sequence of images recorded at adjacent and close time steps. The following equation (10), in such an application, can be applied to estimate the rain rate from each image. An average rainfall rate can then be obtained by averaging the image-specific rainfall rates, thus reducing the sample variability and the inherent uncertainty in rain rate estimation.

The method provides that for each image $Im_j$, where j is an integer index of the number of images, the intensity rain rate $R_{Im_j}$ (expressed in millimeters per hour) is computed considering spherical raindrops with diameters $D_i$, and terminal speeds $v_i$, where i is an integer index of the number of drops within a single image.

Each drop is assumed as responsible of a quota $R_i$ of the total rain rate of one image $R_{I_j}$ so that $R_{I_j}$ can be written as $$R_{Im_j} = \sum_{i=1}^{N} R_i = \sum_{i=1}^{N} \frac{1}{6}\pi \cdot D_i^3 \cdot v_i \cdot \frac{3.6 \cdot 10^{-3}}{V} \quad (10)$$

where N is the total number of drops in the image, $\frac{1}{6}\pi \cdot D_i^3$ is the volume of the i-th drop (in mm$^3$), $v_i$ is the velocity of a i-th drop (in m/s), and V the total sampled volume (in m$^3$).

Furthermore, as aforementioned, the method of the present invention provides for taking into account focused streaks, i.e., their diameters and velocity, for the computation of the rain rate, and not only the blurred streaks.

The method according to the invention can be implemented by means of a computer product which can be loaded into a memory of the image acquisition device and which comprises software code portions adapted to implement said method.

The features of the present invention, as well as the advantages thereof, are apparent from the above description.

A first advantage offered by the method and the image acquisition device according to the present invention is that the estimation of the particles precipitation rate is comparable with that of the prior art techniques.

A second advantage offered by the method and the image acquisition device according to the present invention is that results have errors in the same order of magnitude of the standard measuring devices rain gauges, if the meteorological precipitation is considered).

A further advantage offered by the method and the image acquisition device according to the present invention is to retrieve measures of precipitation intensity at very high temporal resolution (e.g., one measure per second) at a very low cost.

A further advantage offered by the method and the image acquisition device according to the present invention is the possibility to dramatically increase the spatial density of precipitation observations (e.g., one measure/Km$^2$, where Km is a kilometer).

The method and the image acquisition device for measuring a particles precipitation rate according to the present invention may be subject to many possible variations without departing from the novelty spirit of the inventive idea; it is also clear that in the practical implementation of the invention the illustrated details may have different shapes or be replaced with other technically equivalent elements.

According to one possible alternative, for example, the image acquisition device is an intelligent mobile terminal, e.g., a smartphone or a tablet, which implements the method of the present invention. The intelligent mobile terminals available today, and certainly also those available in the future, include at least one camera which can be used for acquiring at least one image to be processed according to the method of the present invention. In such case, virtually, anyone with a smartphone can obtain a rain rate measure in the place where he/she is located and, since smartphones are widespread, the estimation of meteorological conditions in a certain area (e.g., a district) can be improved with respect to known art techniques, e.g., rain gauges, due to the large amount of sampled points.

It can therefore be easily understood that the present invention is not limited to a method for measuring a particles precipitation rate, and related image acquisition device, but may be subject to many modifications, improvements or replacements of equivalent parts and elements without departing from the novelty spirit of the inventive idea, as clearly specified in the following claims.

The invention claimed is:

1. A method for measuring a particles' precipitation rate that results in an improved, reliable measure of said particles' precipitation rate by increasing a spatial density of precipitation observations and enabling measurements of precipitation intensity at high temporal resolution, said method comprising the steps of:
    acquiring at least one first image during a precipitation event through an image acquisition device having a sensor and lens;
    detecting said particles of said precipitation in said at least one first image by subtracting a background of said first image and setting a brightness threshold for detecting said particles, said particles being visible as a plurality of streaks in said image, wherein a first portion of said plurality of streaks comprises blurred streaks, and a second portion of said plurality of streaks comprises focused streaks;
    determining an apparent diameter and an apparent length for said plurality of streaks;
    estimating an actual diameter and an actual length for said plurality of streaks by resolving an equations' system having three equations and three unknowns, namely said actual diameter, said actual length and a depth position of said plurality of streaks, said depth position being the position of each particle from said lens, in which a first equation has said actual diameter as unknown in function of said depth position, a second equation has said actual length as unknown in function of said depth position and a third equation equals the theoretical terminal velocity of said particles with an estimated velocity of said particles in function of said depth position;
    estimating said velocity of said particles based on the ratio between a net streak length and an exposure time used to take said at least one first image;
    estimating said particles' precipitation rate based on said actual diameter and said velocity, resulting in at least said improved, reliable measure of said particles' precipitation rate by increasing said spatial density of precipitation observations and enabling measurements of precipitation intensity at high temporal resolution.

2. The method according to claim 1, further comprising acquiring a second image through said image acquisition device and subtracting said second image from said first image to delete a background of said first image.

3. The method according to claim 1, further comprising determining said depth position of a particle in a sampled volume.

4. The method according to claim 1, wherein said velocity of said particles is estimated based on said depth position of the particles.

5. The method according to claim 1, wherein said particles' precipitation rate is obtained by averaging precipitation rates of a set of acquired images.

6. The method according to claim 1, wherein said particles are in liquid or solid state and comprise one or more of the elements of the group consisting of: hydrometeors, settling particles, and chemical particles.

7. A hardware storage device having stored thereon computer-executable instructions that are executable by at least one processor of said image acquisition device to cause said image acquisition device to implement the method of claim 1.

* * * * *